C. Morey & D. Hummar.
Tailoring.
N° 3161.  Patented July 8, 1843.
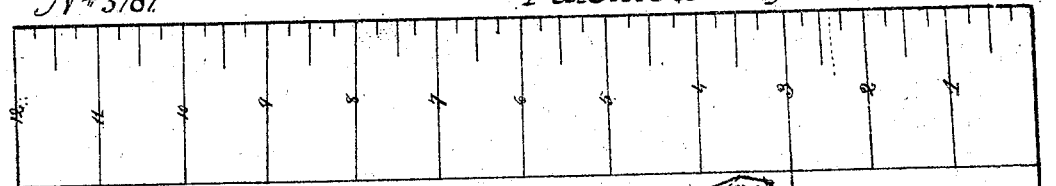
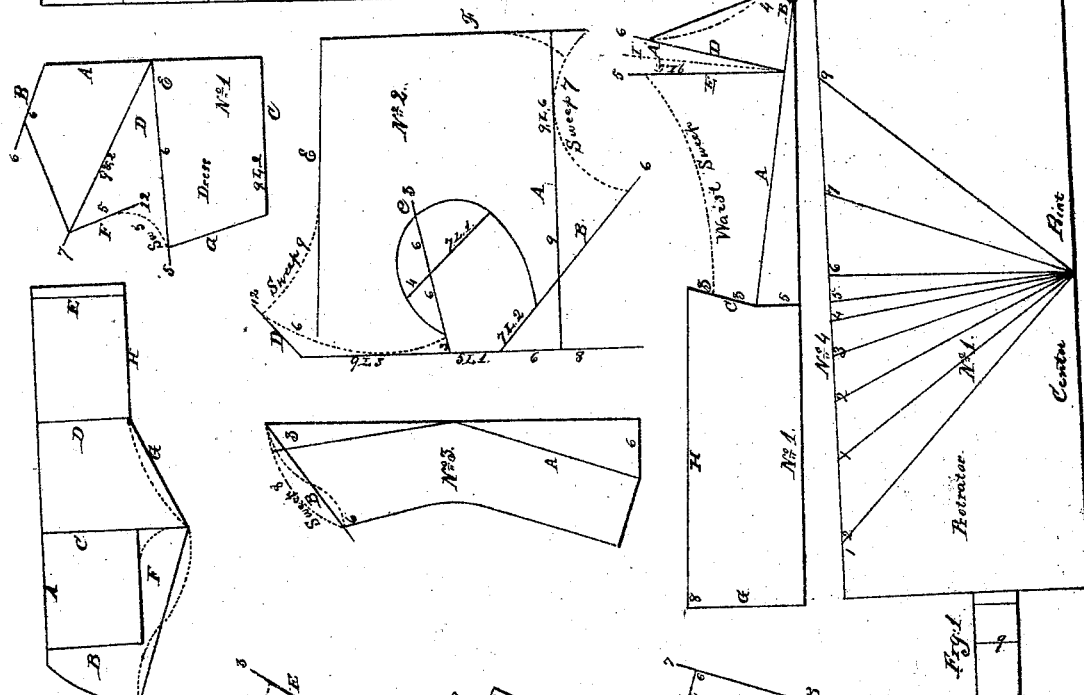
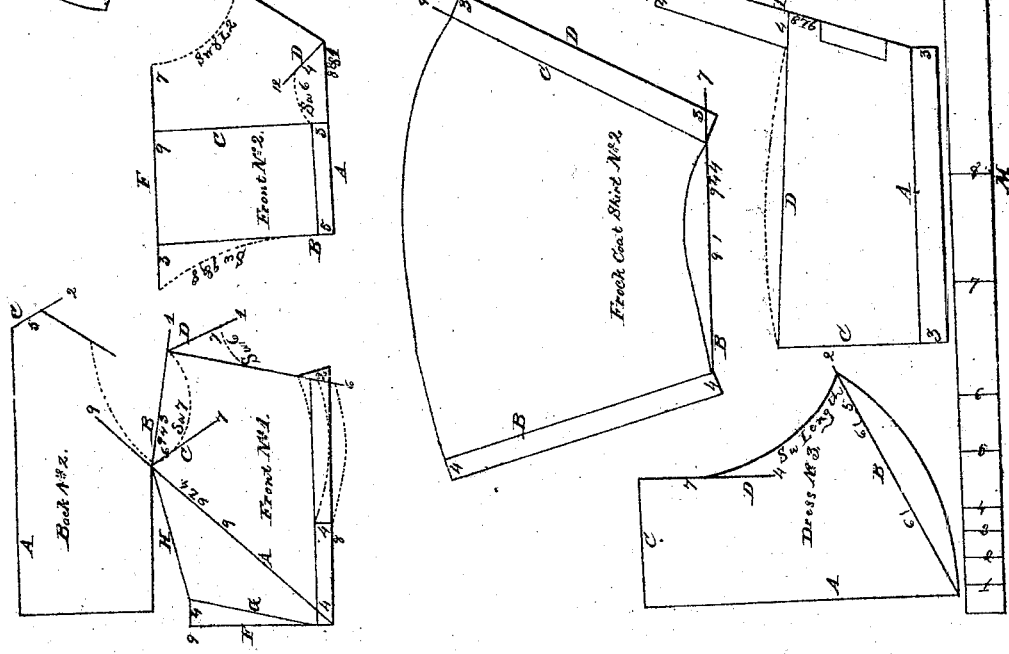

UNITED STATES PATENT OFFICE.

CYRUS MOREY AND DAVID HUMMER, OF McARTHURSTOWN, OHIO.

TAILOR'S MEASURE.

Specification of Letters Patent No. 3,161, dated July 8, 1843.

*To all whom it may concern:*

Be it known that we, CYRUS MOREY and DAVID HUMMER, of McArthurstown, in the county of Athens and State of Ohio, have invented a new and useful Improvement in the Mode of Cutting Clothes for Male and Female Dresses by the Use of the Scale and Protractor on a New Principle; and we do hereby declare that the following is a full and exact description.

First procure a thin piece of brass, iron, wood or pasteboard in the form of a square, the broad part 2¾ inches wide and eight inches long, on the inside of which is laid off the protractor, hereinafter described; the tongue of the square will be one foot in length, and must be laid off in inches and quarters the same manner that a carpenter's or mason's square is laid off; so far the instrument is properly a joiners square, and will be used for marking right angles on the cloth to be cut. Next proceed to construct the protractor for taking angles, which will be done in the following manner: In the center of the broad end of the square, that is four inches from the end, let a line be cut or drawn at right angles cross the blade of the square, this will be known as the center, and the divisions will be right and left from this center line, and all the sub-divisions on the blade will be on the inside of the blade and will be engraved or marked a small way back from the edge, after the manner of a common rule.

To construct the sub-divisions on the protractor the following distances must be observed, taken from Gunthers scale of equal parts, to wit: From the center line, toward the tongue or right hand end of the protractor, lay off a division, distant from the center line twenty four hundredths of an inch by Gunther, this you mark No. 6; then from the center line lay off another division to the right, distant one inch, and thirteen hundredths, this mark No. 7, from the center line lay off a third division to the right, distant two inches and forty eight hundredths, this mark No. 9; now lay off a division to the left of the center line, distant thirteen hundredths of an inch, this mark No. 5; then lay off a division to left as before distant from the center thirty six hundredths of an inch, this mark No. 4; again lay off on same side a division, distant from the center seventy three hundredths of an inch, this mark No. 3; and lay off a division on the same side, distant from the center 1 inch and 33 hundredths, No. 2; again lay off a division on the same side distant from the center, one inch and eighty six hundredths, this mark 33 hundredths, No. 2; again lay off a division distant from the center, two inches, and seventy seven hundredths, this you will mark No. 12 and and the protractor is complete, and will easily be understood by a reference to the accompanying drawing.

To construct a scale measure, as represented at M, Figure 1, take a strip of paper one fourth the length of a strap, that will reach round the breast of the person measured; this is the base or scale of measure for all garments made to fit that person, except when an unnatural form is presented, for example: Suppose the present measure of the subject to be forty inches, in that case your strip of measuring paper will be ten inches long, fold this paper down in the center, and mark at the fold 7—then fold the scale into three equal parts, and mark at each fold the No. 6, and 8, in their proper order; fold the scale again in two equal parts from 0, to 6, and at the fold mark No. 4; fold again from 0 to 4 in two equal parts, and at the fold mark No. 2; fold again in two equal parts from 0 to 2, and at the fold mark No. 1; then fold in two equal parts, from 2 to 4, and at the fold mark No. 3; fold again in two equal parts from 4 to 6, and at the fold mark No. 5; fold again in two equal parts from 8 to 9, and at the fold mark No. 10, and you have all the scale necessary to cut a garment suitable for a subject whose breast measure is 40 inches. For any other size person the course as above; for example, if the subject measures 36 inches, nine inches will be the length of your scale, and divide and number as before.

*Manner of applying the scale and protractor to the purposes for which they were intended.*—On the drawing or diagram hereto affixed the measure taken from the scale is represented by letters, and the angles taken from the protractor by figures, this should be kept in mind to prevent confusion.

In the drawing, the first line in No. 1, marked A is the length of the garment from the collar down the center of the back, to the waist; B, is the line by which the cloth is cut down to the waist, and 5, is the angle of the waist as taken by the protractor. The waist-sweep is taken by length of the line B in the usual manner. The line D, No. 1 is obtained by dropping a line from the point of the sleeve seam A on the shoulder-blade perpendicular to the line A, until it intersects the line B; at the point of intersection, place the center of the protractor, and take the angles 5 and 6. Line F is drawn perpendicular to, and at the end of line B, and from the scale M of measure, is in length, 4. To strike the curve or sweep line E, you take the length of line C, which on the drawing is marked "9 less 5" (which means the distance on the scale from 9 to 5) and with it strike the sweep line C, pursuing this method throughout all parts of the garment and you will have a perfect fit, where the subject possesses natural proportions, where an unusual form is presented, the workman must of necessity make such change as his judgment may dictate.

By following the example above, and properly noting the angles, and measures, of every part of the garment as laid down in the chart no difficulty can exist in fully understanding the descriptions above.

What we claim as our invention, and desire to secure by Letters Patent is—

1. The graduated scale of measure whereby the measure of each subject is made the base of a scale, which of itself answers for every part of the garment, more simple, and easier to be understood as one scale with 12 sizes will answer for cutting an entire suit, whereas with the usual scales not less than forty or fifty sizes, and at least three different scales are used for every possible difference in measure.

2. We also claim as our invention, and for which we desire to secure Letters Patent, the plane protractor attached to the square, instead of the semi-circular, and the mode of projecting the divisions, from the center, by inches and tenths or hundredths, from the scale of equal parts, to produce the desired effect and a proper adjustment of every portion of the garment.

CYRUS MOREY.
DAVID HUMMER.

Witnesses:
A. VAN VORHES,
H. COLE.